United States Patent
Van Der Lee et al.

(10) Patent No.: US 8,982,334 B2
(45) Date of Patent: Mar. 17, 2015

(54) METHOD OF OPERATING A SMI SENSOR AND CORRESPONDING SENSOR DEVICE

(75) Inventors: Alexander Marc Van Der Lee, Venlo (NL); Mark Carpaij, Hertogenbosch (NL); Holger Moench, Vaals (NL); Marcel Schemmann, Maria Hoop (NL)

(73) Assignee: Koninklijke Philips N.V., Eindhoven (NL)

( * ) Notice: Subject to any disclaimer, the term of this patent is extended or adjusted under 35 U.S.C. 154(b) by 345 days.

(21) Appl. No.: 13/390,545

(22) PCT Filed: Aug. 10, 2010

(86) PCT No.: PCT/IB2010/053601
§ 371 (c)(1),
(2), (4) Date: Mar. 28, 2012

(87) PCT Pub. No.: WO2011/021129
PCT Pub. Date: Feb. 24, 2011

(65) Prior Publication Data
US 2012/0176595 A1    Jul. 12, 2012

(30) Foreign Application Priority Data
Aug. 17, 2009    (EP) .................... 09167984

(51) Int. Cl.
*G01C 3/08*    (2006.01)
*G01S 7/483*    (2006.01)
*G01S 17/58*    (2006.01)
*G01S 17/06*    (2006.01)

(52) U.S. Cl.
CPC ............. *G01S 7/483* (2013.01); *G01S 17/58* (2013.01); *G01S 17/06* (2013.01)
USPC .................... 356/4.09; 356/28.5; 356/498

(58) Field of Classification Search
USPC ................................... 356/4.09, 28.5
See application file for complete search history.

(56) References Cited

U.S. PATENT DOCUMENTS

| | | | |
|---|---|---|---|
| 5,359,404 A | 10/1994 | Dunne | |
| 2002/0104957 A1* | 8/2002 | Liess et al. | 250/221 |
| 2002/0139920 A1* | 10/2002 | Seibel et al. | 250/208.1 |
| 2007/0019203 A1 | 1/2007 | Jansen | |
| 2008/0225300 A1 | 9/2008 | Schemmann | |
| 2009/0122295 A1 | 5/2009 | Eaton | |

FOREIGN PATENT DOCUMENTS

| | | |
|---|---|---|
| EP | 0208407 A1 | 1/1987 |
| JP | 2005083954 A | 3/2005 |
| WO | 2007072446 A2 | 6/2007 |
| WO | 2009090593 A1 | 7/2009 |

* cited by examiner

*Primary Examiner* — Tarifur Chowdhury
*Assistant Examiner* — Jonathon Cook

(57) ABSTRACT

The present invention refers to a method of operating a self-mixing interference sensor and a corresponding self-mixing interference sensor device. In the method the laser (1) of the device is controlled to periodically emit a laser pulse followed by an emission period of laser radiation having a lower amplitude. The pulse width of the laser pulse is selected such that the pulse after reflection at the object (3) re-enters the laser (1) during the emission period of laser radiation with lower amplitude. The corresponding SMI signal has an increased signal to noise ratio.

8 Claims, 1 Drawing Sheet

METHOD OF OPERATING A SMI SENSOR AND CORRESPONDING SENSOR DEVICE

FIELD OF THE INVENTION

The present invention relates to a method of operating a self-mixing interference (SMI) sensor for measuring a velocity and/or distance of an object, said sensor at least comprising a laser and a photodetector arranged to measure a variation in output power of the laser. The invention also relates to a self-mixing interference sensor device adapted to operate according to the above method.

BACKGROUND OF THE INVENTION

Laser sensors based on self-mixing interferometry generally provide the possibility of measuring velocities, vibrations and distances and thus cover a broad range of applications. SMI laser sensors make use of the effect that laser radiation which is scattered or reflected back from a target object and re-enters the laser cavity, interferes with the resonating radiation and thus influences the output properties of the laser. The resulting variations in output power or frequency contain traceable information on the movement or the distance of the target object with respect to the sensor. The laser output signal, which contains this information, is typically collected via a photodiode. A movement of the target object, for example, causes a Doppler shift of the backscattered laser radiation which interferes with the laser field in the laser cavity, resulting in a modulation of the intracavity field and output power. The strength of the modulation depends on the strength of the backscattered laser radiation. The operation principle of laser self-mixing is explained, for example, in G. Giuliani et al., "Laser diode self-mixing technique for sensing applications", Journal of Optics A: Pure and applied optics 4 (2002), pages S283 to S294.

The strength of the backscattered laser radiation depends on the laser power of the laser and on the reflection properties of the target object. When the strength of the backscattered laser radiation is low, the noise present in the laser radiation dominates and the modulation representing the SMI signal is no longer observable.

SUMMARY OF THE INVENTION

It is an object of the present invention to provide a method of operating a self-mixing interference sensor and a self-mixing interference sensor device designed to operate according to the method, said method and device achieving an improved signal to noise ratio of the SMI signal.

The object is achieved with the method and device according to claims 1 and 4. Advantageous embodiments of the method and device are subject matter of the dependent claims or are described in the subsequent portions of the specification.

In the proposed method of operating a self-mixing interference sensor for measuring a velocity and/or distance of an object, the at least one laser of the self-mixing interference sensor is controlled to periodically emit a laser pulse followed by an emission period of laser radiation having a lower amplitude than the laser pulse, a pulse width of said laser pulse being adjusted such that the laser pulse after reflection at the object re-enters the laser during the emission period of laser radiation with the lower amplitude. This means that the pulse width t of the laser pulse must fulfill the following condition: $t < 2d/c$, with d being the distance of the object and c the speed of light. In other words, the pulse duration has to be smaller than the time the pulse needs to propagate from laser to object.

The essential feature of the present invention is to apply a pulse modulation of the laser power with a pulse duration that is equal or smaller than the time needed to propagate from the laser to the target object and back. Through this pulse modulation the SMI signal of enhanced signal to noise ratio is restricted to time periods in which the back-reflected or back-scattered pulses interfere with the laser radiation of the lower amplitude in the laser cavity. During these periods the SMI signal is detected and evaluated in order to determine the velocity and/or distance of the object.

The laser of the SMI sensor may be controlled such that the emission period of laser radiation having the lower amplitude extends until the next pulse is generated. The emission period of laser radiation having the lower amplitude may also be of a shorter duration such that the laser power is reduced further (even to 0) until the next pulse is emitted. It is obvious that the duration of the laser emission of lower amplitude following the pulse must be long enough to allow the self-mixing interference of the backscattered or back-reflected laser pulse with this laser radiation in the laser cavity.

With such an operation of the laser of the SMI sensor the signal to noise ratio of the SMI signal S is improved for the following reasons. The SMI signal S is proportional to the interference strength between the back-reflected field with intensity $I_b$ and the field of the laser radiation inside of the laser cavity with intensity $I_1$:

$$S \sim \sqrt{(I_b \times I_1)}$$

The noise of this signal is determined by the laser noise, defined as $n(I_1)$, and n is a function of the intensity of the laser $I_1$. For a constant laser power as is the case in the known operation mode of such a SMI sensor, the signal to noise ratio SNR is given by:

$$SNR \sim \sqrt{(I_b \times I_1)}/n(I_1).$$

When the SMI laser sensor is operated according the proposed method, the laser is pulsed with a higher intensity $g \times I_1$, and the pulse duration is equal or shorter than the round trip time from the laser towards the target object and back. The back-reflected laser radiation then will have an increased power $g \times I_b$, where $I_b$ is taken as the power level of the reflected laser light of the low intra cavity power. When the SMI signal S is observed during the period of interference between the back-reflected pulse and the normal laser radiation of lower intensity, the signal S has an increased strength of $\sqrt{(g \times I_b \times I_1)}$. On the other hand, the noise remains the same as $I_1$ is not changed and the back-reflected portion $g^* I_b$ is still small against $I_1$. So the overall signal to noise ratio increases with $\sqrt{g}$. When the detection of the SMI signal is time-gated so that this signal is only detected or evaluated during the periods of overlap of the high power back-reflected pulse and the laser radiation with the normal (lower) laser intensity, the signal to noise ratio is increased according to the above explanation.

The pulse duration of the laser pulses should preferably be longer than the inverse of the relaxation oscillation frequency of the laser. This condition ensures that the laser dynamics of the field equations can be neglected and the conventional SMI description still applies. For example, a typical number for the distance between the target object and the laser is 30 cm. This means that according to the proposed method the pulse duration should preferably be equal to or lower than 2 ns. In case of a vertical cavity surface emission laser (VCSEL) the relaxation oscillation frequency is above 10 GHz when the laser is operated sufficiently well above threshold. Therefore, the pulse duration should be adjusted to be longer than 0.1 ns, i.e. should be in the range between 0.2 and 2 ns. In the proposed method, overlap between the reflected laser field and the laser field in the laser cavity is necessary. In the above case this means that the change in output power of the pulse needs to be faster than 2 ns, or in the general case, faster than the time it takes for the light to propagate from laser to target and back.

The pulse modulation of the laser emission may be performed by different known measures in the field of laser technology, in which the gain or loss inside of the laser cavity is appropriately controlled. In case of a laser diode as the laser of the SMI sensor, the modulation can be performed by modulation of the driving current of the laser diode periodically, such that a first driving period with a high driving current is followed by a second period with a lower driving current. The first period corresponds to the generation of the laser pulse and the second period to the generation of laser radiation having the lower amplitude. The modulation through the driving current allows a very simple generation of the desired pulsed emission behavior of the laser diode.

The corresponding self-mixing interference sensor device therefore at least comprises a laser, preferably a laser diode, a photodetector arranged to measure a variation in output power of the laser, and a control unit controlling the laser to emit laser radiation. The control unit is designed to control the laser to periodically emit a laser pulse with a pulse width and pulse amplitude followed by an emission period of laser radiation having a lower, preferably constant, amplitude. The pulse width is selected such that the pulse after reflection at an object to be sensed re-enters the laser during the emission period of laser radiation with the lower amplitude. The pulse width is preferably adjusted or selected to be equal or less than 2 ns. With such a value, the typical applications of such a SMI sensor device and its measuring ranges are covered.

A detection unit connected to or integrated with the SMI sensor detects and evaluates the signal of the photodetector in a known manner to determine the velocity and/or distance of the object based on the measured variation in output power. The photodetector may be part of the detection unit or otherwise is connected to the detection unit. The detection unit only evaluates the signal periods of the photodetector which are measured during the overlap of the backscattered pulse and the laser radiation having the lower amplitude, i.e. when the back-reflected laser pulse interferes with this radiation inside of the laser cavity. Only during these periods the SMI signal is evaluated or detected. Preferably, the signal delivered from the photodetector or the operation of the photodetector is gated appropriately to provide a signal only during the above periods.

The proposed method can also be applied to SMI sensor devices having more than one laser. These lasers may share only one detection unit in order to reduce the costs of such a device. In this case, the different lasers are controlled such that the laser pulses of the different lasers are emitted one after the other and do not overlap in time. Thus, also the SMI signals with the increased signal to noise ratio do not overlap in time and can be detected by the detection unit in a temporal sequence. By this measure the whole device can be operated advantageously with a single detection unit.

With the proposed method and corresponding SMI sensor device the signal to noise ratio of a SMI signal can be increased compared to cases in which an SMI sensor is operated at normal operation conditions, i.e. with constant amplitude of the laser radiation. When such a laser is operated far above threshold, the laser radiation includes shot noise increasing with $\sqrt{(I_1)}$. Since at higher power the laser is normally close to a mode transition, the noise is not only dominated by the shot noise but also increases due to the so called mode partition noise. In such a case, the pulsed technique according to the present invention has significant advantages since the high intensity noise is only present in the back-reflected pulse which is already weak due to the refection and will not influence the SMI signal. Another advantage of the proposed method and corresponding device is that the laser can be operated at a lower average operation current and hence at lower average temperature. This is beneficial for the lifetime of the laser which is normally shorter for higher operating temperatures.

BRIEF DESCRIPTION OF THE DRAWINGS

The proposed method and device are described in the following by way of example in connection with the accompanying figures without limiting the scope of protection as defined by the claims. The figures show:

DETAILED DESCRIPTION OF EMBODIMENTS

Figure 1:
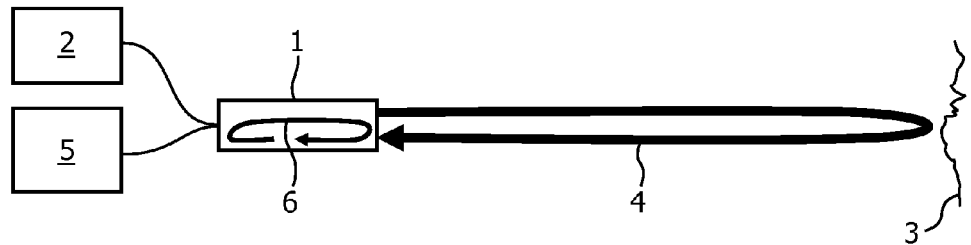
FIG. 1 an example of a schematic setup of the proposed SMI sensor device.

FIG. 1 shows an example of a schematic setup of the proposed SMI laser sensor device when measuring the velocity or distance of a target object. The SMI laser sensor device comprises a laser 1 connected to a laser pulse driver 2. The laser pulse driver represents or is part of a control unit of the laser 1 and generates a modulated driving current such that the laser 1 periodically emits laser pulses followed by a period of laser emission with a lower amplitude or intensity compared to the pulses. The pulses are directed towards a target object 3 and in part back-reflected into the cavity of the laser 1. The emitted and back-reflected laser radiation 4 is indicated in FIG. 1. The laser 1 is controlled such that a high intensity field corresponding to a laser pulse is generated, and when this laser pulse is back-reflected at the target object 3 and re-enters the laser cavity 1, the laser intensity is switched to a normal (lower) operation level and the laser power or laser intensity is detected by a detection unit 5. The back-reflected laser pulse when re-entering the laser cavity interferes with the internal laser field 6 generating a modulation in output power or internal power, i.e. the SMI signal. Since this SMI signal corresponds to a higher back-reflected intensity compared to back-reflected radiation at normal laser operation (without pulses of higher intensity), the signal to noise ratio is increased. The detection unit 5 then evaluates the detected signal in order to determine the distance and/or velocity of the target object. This evaluation is the same as already known from the prior art of measuring distances and/or velocities with SMI sensors (see for example the publication of G. Giuliani et al. mentioned in the introductory portion of this description).

Figure 2:
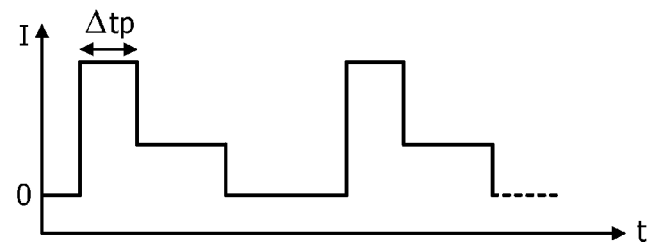
FIG. 2 two examples of the driving current for the pulse modulation of the laser radiation.
Figure 2:
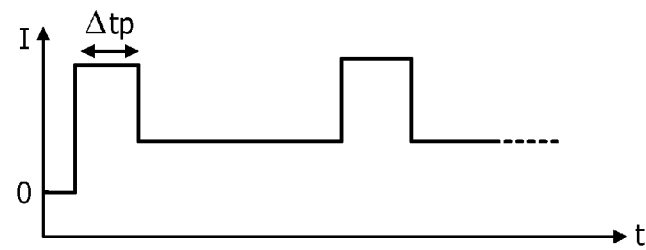

FIG. 2 shows two examples of driving currents for generating the pulsed laser output according to the present method. In the first example, the pulses are generated with a pulsed driving current having a pulse width $\Delta t_p$ and followed by a period of lower driving current which then is reduced to zero until the next pulse is generated. Another possibility is to maintain the lower driving current following the higher current for generating the pulse until the next pulse is generated. This is shown in the second diagram of FIG. 2. Nevertheless, the current between the pulses may also additionally vary. The period of lower driving current should have at least a duration which ensures that the interference between the back-reflected pulse with the laser radiation of lower amplitude can occur inside of the laser cavity and can be detected by the detection unit 5, which is connected to or includes an appropriate photodiode.

Figure 3:
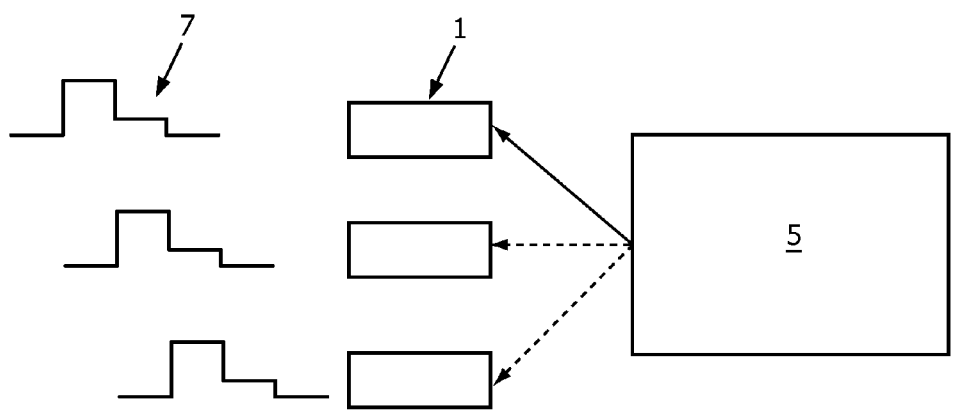
FIG. 3 an example showing the principle of operation according to the proposed method in case of SMI sensors having two or more lasers.

FIG. 3 shows an example of a SMI sensor device having three lasers 1. In order to lower the costs of such a SMI sensor device, the detection electronics, i.e. the detection unit 5 is shared by the three lasers 1. The lasers are operated in a pulsed mode according to the present invention. This operation is performed such that the pulses emitted by the lasers and thus also the underlying current pulses do not overlap in time as is schematically shown on the left side of this figure showing a time portion of the run of the driving current of the corresponding lasers 1. This allows a sequential sampling of the signals of the different lasers. In this case when the signal of the first laser is detected, i.e. when the back-reflected portion of the high-intensity pulse overlaps with the radiation having normal laser intensity, the pulse of the second laser is already generated. After detection of the signal of the first laser the detection unit 5 is switched to the second laser for which then the back-reflected pulse portion is re-entering the laser cavity, and so on. For all detected SMI signals the signal to noise ratio is thus increased according to the present invention and at the same time the operation of three or more lasers with only one detection unit 5 is achieved.

While the invention has been illustrated and described in detail in the drawings and forgoing description, such illustration and description are to be considered illustrative or exemplary and not restrictive, the invention is not limited to the disclosed embodiments. The different embodiments described above and in the claims can also be combined. Other variations to the disclosed embodiments can be understood and effected by those skilled in the art in practicing the claimed invention, from a study of the drawings, the disclosure and the appended claims. For example, the driving current for generating the pulsed output of the laser may also be different from the schematic run shown in FIG. 2. In particular, the pulse form may also differ from a rectangular form. Furthermore, the modulation of the laser emission may also be performed in another way independent of the driving current. The laser of the device is not restricted to a laser diode but may also be another type of laser, for example an optically pumped solid state laser.

In the claims, the word "comprising" does not exclude other elements or steps, and the indefinite article "a" or "an" does not exclude a plurality. The mere fact, that measures are recited in mutually different dependent claims does not indicate that a combination of these measures can not be use to advantage. Any reference signs in the claims should not be construed as limiting the scope of these claims.

LIST OF REFERENCE SIGNS

1 laser
2 laser pulse driver
3 target object
4 back-reflected laser radiation
5 detection unit
6 internal laser field
7 run of driving current

The invention claimed is:

1. A method of operating a self-mixing interference sensor for measuring a velocity and/or distance of an object, said sensor comprising a laser and a photodetector arranged to measure a variation in output power of the laser, the method comprising the steps of:
controlling the laser wherein the laser is controlled to periodically emit a laser pulse followed by an emission period of laser radiation having a lower amplitude than the laser pulse;
adjusting a pulse width of said laser pulse such that said laser pulse after reflection at the object re-enters the laser during the emission period of laser radiation with the lower amplitude.

2. The method according to claim 1, further including the step of evaluating a measurement signal of the photodetector only during periods in which the laser pulses reflected at the object and re-entering the laser interfere with the laser radiation of lower amplitude in the laser.

3. The method according to claim 1, further including the step of allowing the detection unit to detect or evaluate measurement signals of the different lasers sequentially, when a the self-mixing interference sensor comprises several lasers sharing one detection unit, and the several lasers are controlled such that the laser pulses of the different lasers do not overlap in time.

4. A self-mixing interference sensor device at least comprising
a laser,
a photodetector arranged to measure a variation in output power of the laser and
a control unit controlling the laser to emit laser radiation, wherein said control unit is designed to (1) control the laser to periodically emit a laser pulse followed by an emission period of laser radiation having a lower amplitude than the laser pulse, and (2) adjust a pulse width of said laser pulse such that said laser pulse after reflection at an object to be sensed re-enters the laser during the emission period of laser radiation with the lower amplitude.

5. The device according to claim 4, wherein the control unit is designed to control the laser to emit the laser pulse by applying a modulated driving current to the laser.

6. The device according to claim 4, wherein said pulse width is equal or less than 2 ns.

7. The device according to claim 4, wherein a detection unit is provided in which a measurement signal of the photodetector is evaluated to determine a velocity and/or distance of the object based on the measured variation in output power, said detection unit being designed to detect or evaluate the measurement signal only during periods in which the laser pulses reflected at the object and re-entering the laser interfere with the laser radiation of lower amplitude in the laser.

8. The device according to claim 7, comprising several lasers sharing said detection unit, wherein the control unit is designed to control the several lasers such that the laser pulses of the different lasers do not overlap in time.

\* \* \* \* \*